(12) United States Patent
Brandsma et al.

(10) Patent No.: US 6,217,471 B1
(45) Date of Patent: Apr. 17, 2001

(54) METAL BELT AND METHOD FOR PRODUCING SUCH

(75) Inventors: Arjen Brandsma, Tilburg; Johannes Hendrikus Van Lith, Berlicum; Cornelis Johannes Maria Van Der Meer, Tilburg; Johannes Haaije Van Der Kamp, Tilburg; Cornelus Hendricus Maria Van Oirschot, Tilburg; Gerardus Petrus Maria Van Dijnsen, Eindhoven, all of (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/290,876

(22) Filed: Apr. 14, 1999

(30) Foreign Application Priority Data

Apr. 14, 1998 (EP) .................................. 98201210

(51) Int. Cl.⁷ ................................ F16G 1/22; F16G 5/16
(52) U.S. Cl. ........................................... 474/242; 474/201
(58) Field of Search ................................. 474/242–245, 474/237, 201, 272, 252

(56) References Cited

U.S. PATENT DOCUMENTS

| | | | |
|---|---|---|---|
| 3,720,113 | * 3/1973 | Van Doorne et al. | 474/242 |
| 3,949,621 | 4/1976 | Beusink et al. | |
| 4,303,403 | * 12/1981 | Lamers | 474/242 X |
| 4,386,921 | * 6/1983 | Roberts | 474/242 X |
| 4,484,903 | * 11/1984 | Schneider | 474/242 |
| 4,501,578 | * 12/1985 | Schneider | 474/242 X |
| 4,698,050 | 10/1987 | Hattori et al. | |
| 5,123,879 | * 6/1992 | Lecouturier et al. | 474/242 |
| 5,152,723 | 10/1992 | Herbert et al. | |

FOREIGN PATENT DOCUMENTS

| | | |
|---|---|---|
| 0 181 670 B1 | 5/1986 | (EP) . |
| 59-080772 | 5/1984 | (JP) . |
| 61-070245 | 4/1986 | (JP) . |
| 61-290257 | 12/1986 | (JP) . |

* cited by examiner

*Primary Examiner*—David Fenstermacher
*Assistant Examiner*—Marcus Charles
(74) *Attorney, Agent, or Firm*—Young & Thompson

(57) ABSTRACT

A drive belt for a continuous variable transmission includes at least one endless metal band, preferably provided in a set of nested bands, at least partly being surrounded by transverse elements for at least clamping the belt in between the sheaves of a set of pulleys. At least one band is shaped such, as seen in cross section, that the arithmetical relation between thicknesses TA, TB and TC at three points PA, PB, PC on a contact face, given by the formula (1−(TA+TB)/ 2TC) represents a value greater than 0.001 and smaller than 0.100, wherein points PA, PB and PC are indicative of a substantially transverse line relative to the longitudinal direction of the band, wherein point PC is located between PA and PB, wherein points PA and PB are located near the edge of the band.

13 Claims, 2 Drawing Sheets

METAL BELT AND METHOD FOR PRODUCING SUCH

BACKGROUND OF THE INVENTION

The present invention relates to a metal belt for a continuously variable transmissions and a method for producing such, where the belt comprises at least one endless metal band, preferably provided in a set of generally conforming nested bands, at least partly being surrounded by transverse elements for at least clamping the belt in between the sheaves of a set of pulleys.

DESCRIPTION OF THE RELATED ART

Such a metal belt is generally known, e.g. from U.S. Pat. Spec. No. 3,949,621. The bands of this known construction have a generally rectangular cross section. Due to its nature of use in continuously variable transmissions, the known belt is during operation subjected to extremely high internal stresses varying in height with the radius of bending and with the moment transmitted or the pull force in a band resulting there from. For this reason avoidance of breakage of the belt during the service life of a belt, i.e. the transmission and vehicle wherein it is to be applied, is a main point of consideration with such belts, in particular with the bands of a belt.

One technical measure intended for prolonging service life is known from European patent publication EP-B-181670. This document teaches to provide permanent compression stresses in the central and edge part of the contact faces of the bands of the belt, thus resulting in a reduction of the level of locally occurring tensile stresses. The publication further teaches the deformation of the edge zones towards a confined shape so as to reduce tensile stresses, particularly occurring from bendings, as a result of which breakage caused by hairline cracks occurring from the edges would be largely avoided.

SUMMARY OF THE INVENTION

The present invention seeks to provide at least a further if not an alternative solution in raising belt service life. According to the invention this may be achieved by accurately defining a particular geometry of a bands cross-section. Bands according to the present invention show extremely small though measurable differences in the thickness along a cross section of a band. It was found in practise however, that the overall shape of a cross section influences the service life time of a belt, to the extend that extremely small deviations from an imaginary rectangular cross section of a band account for significant influence on the expected service life time of a belt.

One factor mentioned to explain the above effect is that a band shaped according to the invention provides a certain amount of precompensation for so called anticlastic deformation occurring during the operation of a belt. However, the local differences in diameter of bending caused by anticlastic deformations hardly effects increase in internal strain as may be expected locally in a band. Moreover, a full precompensation of this effect, for as far as might be achieved, would require a thickness ratios between TA and TC or TB and TC of about 0.5. Nevertheless the minimal amount of deviation from an imaginary cross section, according to the invenvention realises a significant increase in expected life time, and may advantageously be realised by a shaping roller having a relatively easy to produce conformingly shaped roller surface.

It is remarked that anticlastic deformation per se is a generally known phenomenon, e.g. from the article "an optimum study of the anticlastic deformations of strips with tapered edges" as published in the int. Journal of Mechanical Science, 1966, vol. 8. For compensating for anticlastic deformation, this article teaches to concentrate on tapering configuration of the edges. The present invention however differs from these known strip shapes in that the contact face of a band shows a deviation from a flat surface and in that the invention is related to the overall shape of a bands cross section of minimal order. Also, the general art does not take account of the function of taking up extremely high tensile forces as inherent to a bands function, nor of the material a band or strip is made of.

Further, from the article "Hypergeometric Series Solutions of some Anticlastic Deformation Problems", by Y. C. Pao et.al., published in 1967, a strips cross section is known, the section being defined such that the local thickness is a function of the greatest thickness of the strip and the lateral displacement from a strips centre, such that the thickness of a strip constantly decreases from its greatest thickness in the centre towards zero thickness at a lateral side of the strip. The article is primarily devoted to the mathematical solutions to the problem of anticlastic deformations.

With the present invention the edge zones may comprise ordinary facet rounding or leveling of square edges, as generally known in the art. Measuring of the thickness of a bands edge position should take place beyond such rounding. Normally half a millimeter length away from the edge will provide sufficient distance to such rounding while still being close to the outer edge.

Preferably, a band has a cross section of such shape, that the flat surfaces of contact faces of a band have a smoothly curved surface. In a further development of the geometry according to the invention the thickness in between the two edges of a band is larger than the thickness of any of these. Yet according to a further feature according to the invention, the largest thickness is located substantially centrally in the middle between the edges. In the most preferred embodiment said surface of the band is of elliptical nature. This geometry according to the invention approximates, at least, or is enclosable by circular sections having radii R1 and R2, such that the difference between 1/R1 and 1/R2 is smaller than 1.0 m$^{-1}$, where R1 is the radius for the ellipse of one side face, and wherein R2 is the ellipse radius of the counter side. Where the sum of 1/R1 and 1/R2 should be smaller than 1.0 m$^{-1}$.

BRIEF DESCRIPTION OF THE DRAWINGS

The invention will now further be explained by way of examples given in the accompanying drawing wherein:

FIG. 1 is a schematic illustration of the transmission and belt the present invention relates to;

DESCRIPTION OF THE PREFERRED EMBODIMENTS

Figure 1:
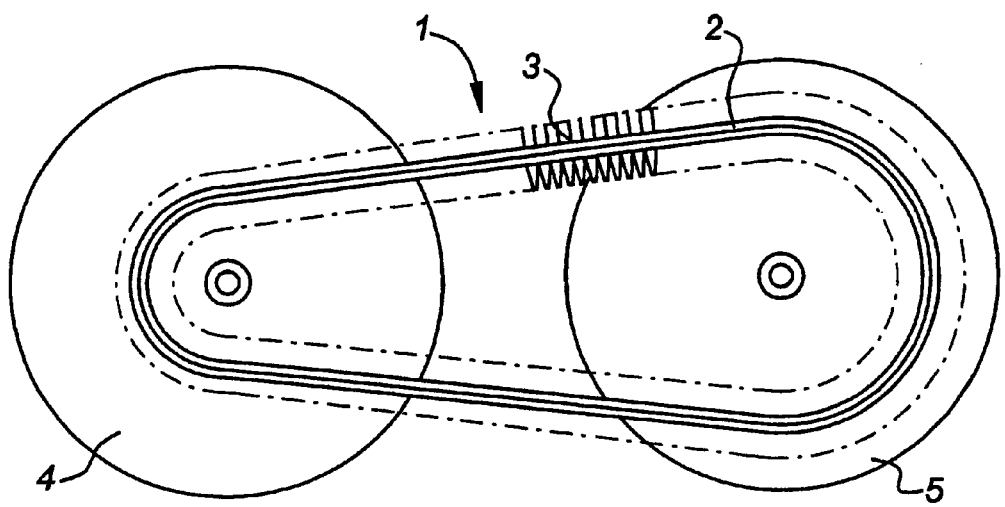

FIG. 1 shows schematically a continuous variable transmission (CVT) with a conveyor belt 1 which is made up of endless thin bands 2, and on which there are an endless continuous series of cross elements 3 which slide freely there over. They move between the sheaves of pulleys 4 and 5, with steplessly variable diameter. Such a continuous variable transmission is known per se. Typical thicknesses of a band range from 0.15 to 0.20 mm. Typical widths of a band range from 8 to 35 millimeters. Typical circumferential lengths of a drive belt 1 range from 50 to 100 cm. For reasons of economical production and for preventing technical complexity, a belt usually runs between pulleys 4, 5 of which only one sheave is arranged axially movable, while the other is arranged rotationally and axially fixed to an axle of rotation. This arrangement means that during operation the alignment of a belt 1 and its bands 2 deviates from the ideal position orthogonal to the axles of rotation. For coping with this "mis-alignment" the contact faces of the transverse elements against which the inner bands rests are provided with a slightly convex curvature.

The edges of the band 2 are rounded off by schematically represented facet roundings or levelings F, as usual in the art. The lateral sides L of a band 2 are shaped flat and have a height TC minus the amount of decrease in thickness in lateral direction and minus the height of facet roundings F.

Figure 2:
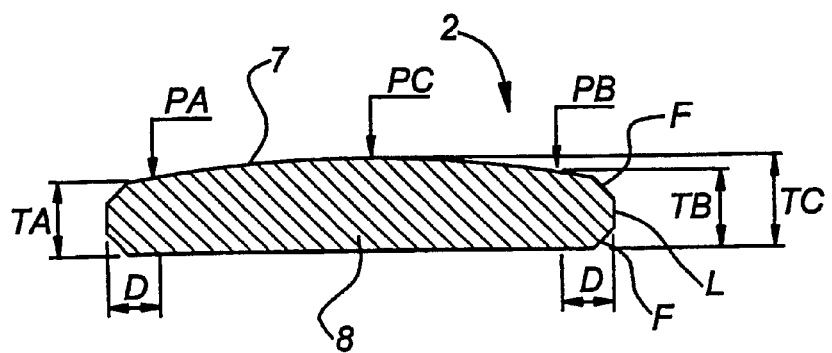
FIG. 2 is a schematic drawing indicating a measuring method for measuring curvature according to the invention.
Figure 3:
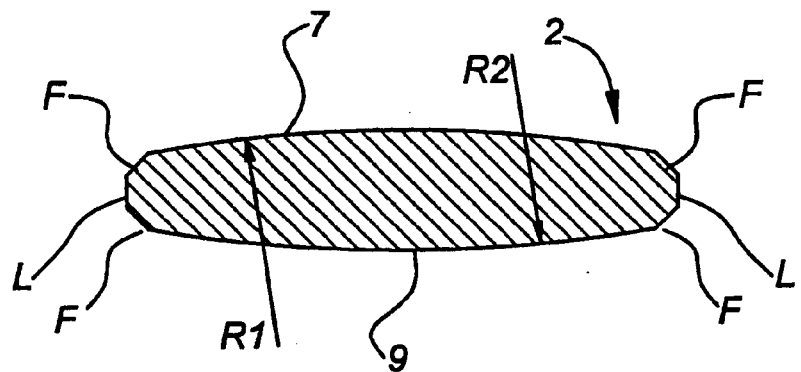
FIG. 3 indicates a geometry of a cross section of a band according to the invention.

As indicated in FIG. 2, thicknesses TA and TB of the lateral positions of a band 2 should, for purposes of indicating the configuration of contact faces according to the invention, be measured closest at points PA and PB to the lateral sides L, however beyond the facet roundings F. Typically, a transverse distance D of between 0.5 and 1.0 millimeter provides a good measuring point. Measuring should take place along an imaginary transverse line relative to the longitudinal direction of a band, and generally square to the imaginary plane that can be imagined more or less centrally between both contact faces of a band. A thickness TC should according to the invention be measured at some point between points PA and PB on or in the immediate vicinity of said imaginary transverse line. The thicknesses in dimensionless index BI, calculated by the formula (1−(A+B)/2C) should lead to a value greater than zero. It is remarked that according to the invention TA, TB and TC may differ significantly provided that TA, TB and TC satisfy the given formula. For achieving a sufficient degree of accuracy, measuring of TA, TB and TC should take place at least five times, each time on a different location on a band, mutually displaced at least one centimeter. A so called mara-meter may be used. The formula for index BI, in conformance with the invention shows that one lateral side may be thicker than the other.

FIG. 2 schematically represents an embodiment of the invention where inner and outer contact face 7 and 9 are both convexely shaped. Preferably but not necessarily both contact faces are curved according to a circular section having diameters R1 and R2 respectively. The radii R1 and R2 may be of equal length. Preferably the center of the R1 and R2 are both located on a common, imaginary line at a generally right angle to a contact face 7 or 9, and located in the centre thereof. For achieving a favourable geometry, according to the invention, the sum of 1/R1 and 1/R2 should be greater than 1.0 m$^{-1}$. In the present example one contact face shows a decrease by 1 micrometer from TC to TA or TB, where as the other shows a decrease of 2 micrometer. In a preferred embodiment the both sides are shaped with a substantially similar amount of decrease towards the edges L.

Figure 4:
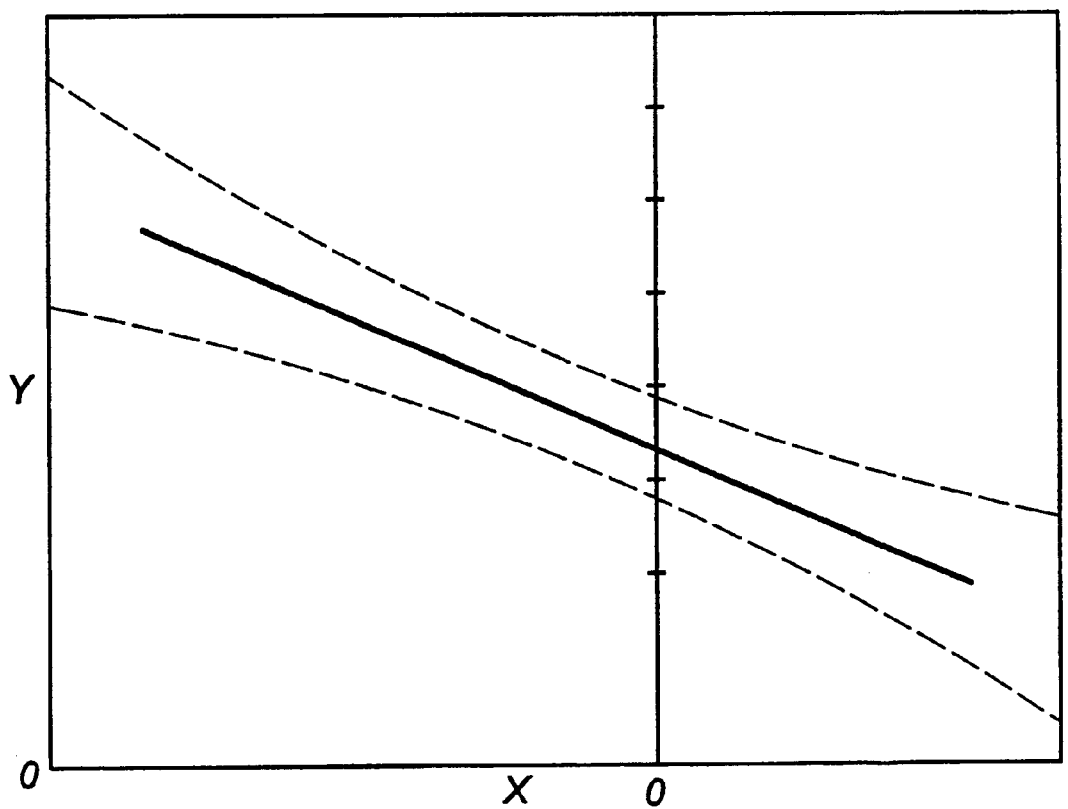
FIG. 4 is a plot indicating the relation between the geometry according to the invention and the to be expected service lifetime of the belt.

FIG. 4 is an illustration of the correlation found between the distribution of thickness over a bands cross section, represented above given formula along axis X and the expected service lifetime of the belt along axis Y. In the graph the zero line for X represents a perfectly rectangular shape of a bands cross section. To the left of this axis the index BI, (1−(TA+TB)/2TC), for the thickness distribution as explained above increases. To the right of this X=0 line the index represents the amount of the inverse shape, i.e. the amount by which the lateral sides of a band are thicker than the middle portion thereof. Upwardly along the Y-axis an index for expected life time is indicated, e.g calculated on the basis of number of revolutions of a belt 1 within a pulley assembly in one or more certain rations.

According to the invention it was found for belts of the above described typical dimensions, that within the range of indexes, BI=(1−(TA+TB/2TC)), between 0.001 and 0.1, the relationship between the index BI as the expected service live is to a significant degree linear and accounts for a significant influence on belt service life. This is in the graph shown by a regression line represented in bold in between dotted lines, the dotted lines representing the boundaries for the location and angle of highly probable regression lines. For increasing values of the index BI at both sides of BI=0, the relationship becomes non linear. The graph nevertheless is indicative of the finding that within the specified range significant increase in service lifetime is achieved by an extremely small, though practically measurable raise of at least part of a contact face, located between the edge parts.

The invention further relates to all details indicated in the following claims and figures.

What is claimed is:

1. A drive belt for a continuously variable transmission, comprising:

an endless metal band assembly, provided as a set of nested metal bands, and at least partly surrounded by transverse elements for at least clamping the drive belt in between sheaves of a set of pulleys, one of the nested metal bands being provided with a central portion having a cross-section, the cross-section having a minimal but consistent degree of greater thickness than surrounding lateral portions, first and second lateral faces, and a first contact face with a first curvature (R1) and a second contact face with a second curvature (R2), both contact faces being smoothly curved, each of the first and second curvatures defining a circular radius greater than one meter, and wherein the one band is substantially symmetrically shaped in respect of an imaginary plane located centrally between the first and second lateral faces (L) of the one band.

2. The drive belt of claim 1, wherein the cross-section of the one of the set of nested metal bands is shaped such that the arithmetical relation between a first thickness (TA), a second thickness (TB) and a third thickness (TC) as measured respectively at a first point (PA), at a second point (PB) and at a third point (PC) on one of the first and second contact faces, is given by the formula (1−(TA+TB)/2TC) which represents a value, the value is greater than 0.001 and smaller than 0.100, the first, second and third points (TA, TB, TC) are indicative of a substantially transverse line relative to a longitudinal direction of the one band, third point (PC) is located substantially centrally between first and second points (PA, PB), and the first and second points (PA, PB) are each located near an edge of the one band.

3. The drive belt of claim 1, wherein the cross section decrease in thickness from a center of the one nested metal band towards sides of the one nested metal band is between 1 micron and 20 microns, with a bandwidth between 8 and 35 millimeters.

4. The drive belt of claim 1, wherein the one nested metal band is substantially symmetrically shaped in respect of an imaginary plane located centrally between the first and second contact faces.

5. The drive belt of claim 1, wherein each of the first and second contact faces are shaped convexly such that $0.010 \text{ m}^{-1} <= 1/R1+1/R2 <= 1.0 \text{ m}^{-1}$, R1 and R2 defining a radii associated with each of the first and second contact faces.

6. The drive belt of claim 1, wherein the one nested metal band is made of maraging steel.

7. The drive belt of claim 1, wherein the drive belt comprises a plurality of inner nested metal bands and outer nested metal bands, and plural of the inner nested metal bands are configured as the one of the nested metal bands.

8. The drive belt of claim 1, wherein a majority of the nested metal bands are configured as the one of the nested metal bands.

9. The drive belt of claim 1, wherein all of the nested metal bands are configured as the one of the nested metal bands.

10. The drive belt of claim 2, wherein the first thickness (TA) is greater than any of the second thickness (TB) and the third thickness (TC).

11. The drive belt of claim 2, wherein the first thickness (TA) and the second thickness (TB) are measured in the immediate vicinity of an ordinary facet rounding (F).

12. The drive belt of claim 2, wherein the first, second and third thicknesses (TA, TB, TC) are the mean of five measurements on longitudinally displaced locations on the one band.

13. A method of producing a drive belt for a continuously variable transmission, the drive belt having an endless metal band assembly, provided as a set of nested metal bands, and at least partly surrounded by transverse elements for at least clamping the drive belt in between sheaves of a set of a pulleys, one of the nested metal bands being provided with a central portion having a cross-section, the cross-section having a minimal but consistent degree of greater thickness than surrounding lateral portions, first and second lateral faces, and a first contact face with a first curvature (R1) and a second contact face with a second curvature (R2), both contact faces being smoothly curved, each of the first and second curvatures defining a circular radius greater than one meter, and wherein the one band is substantially symmetrically shaped in respect of an imaginary plane located centrally between the first and second lateral faces (L) of the one band, comprising the steps of:

deforming the one band by leading the one band between surfaces of two deformation elements adapted for creating a band contact face corresponding to the one band;

subsequently annealing the one band; and thereafter heating the one band in a nitrogen environment to chemically create a superficial permanent compression layer.

* * * * *